United States Patent Office 2,997,453
Patented Aug. 22, 1961

2,997,453
BLENDS OF ETHYLENE POLYMERS AND A HYDROGENATED POLYBUTADIENE
James N. Short and James E. Pritchard, Bartlesville, Okla., assignors to Phillips Petroleum Company, a corporation of Delaware
No Drawing. Filed Oct. 2, 1958, Ser. No. 764,778
4 Claims. (Cl. 260—45.5)

This invention relates to compositions of matter comprising ethylene polymers. In one aspect, the invention relates to compositions comprising a high density, highly crystalline polymer of ethylene and a particular hydrogenated polybutadiene. In another aspect, the invention relates to a method for preparing such compositions of matter.

Various methods are described in the literature for producing normally solid and semisolid polymers. For example, hydrocarbons, such as ethylene, propylene, isobutene, butadiene, and styrene, can be polymerized either independently or in various admixtures with one another, to produce solid or semisolid polymers. Recently, considerable attention has been directed to the production of solid polymers of ethylene. The polymerizations are frequently carried out at low pressures in the presence of solid catalysts, and high molecular weight polymers have been produced which have properties superior to those of low density, low crystallinity polymers prepared by previously known methods. These polymers differ from the latter polymers, which can be produced by high pressure processes, particularly as regards their high crystallinity, which may be in excess of 90 percent at 25° C., and they are especially useful where high stiffness and high tensile strength are desired. However, it has been found that these high density, highly crystalline polymers of ethylene are to some extent subject to environmental stress cracking. This property of the polymers is an undesirable one when the polymers are used in certain applications, such as in the fabrication of pipe and in wire coating.

It is, therefore, an object of this invention to provide a composition containing a high density, highly crystalline polymer of ethylene, which does not present a stress cracking problem.

Another object of the invention is to provide a novel composition of matter comprising a high density, highly crystalline polymer of ethylene and a hydrogenated polymer of butadiene prepared from a polymer having at least 85 percent 1,4-addition.

A further object of the invention is to provide a method for preparing a novel composition of matter comprising a high density, highly crystalline polymer of ethylene and a particular hydrogenated polymer of butadiene.

Other and further objects of the invention will become apparent to those skilled in the art upon consideration of the accompanying disclosure.

The instant invention is based upon the discovery that if a high density, highly crystalline polymer of ethylene is blended with a particular hydrogenated polymer of butadiene, the resulting composition of matter is one which does not present a stress cracking problem. Broadly speaking, the novel composition of this invention comprises a high density, highly crystalline polymer of ethylene and a hydrogenated polymer of 1,3-butadiene, at least 85 percent of the butadiene polymer being formed by 1,4-addition of the monomer unit. It is necessary to employ this specific hydrogenated polymer of butadiene in the composition, for otherwise the stress cracking problem still exists. It is completely unexpected that such a hydrogenated polymer when blended with a high density, highly crystalline polymer of ethylene will produce a composition which is not subject to stress cracking. When butadiene polymers having configurations other than those used in the instant invention are hydrogenated and then blended with a high density, highly crystalline polymer of ethylene, a composition is obtained which is still subject to stress cracking. For example, a polybutadiene prepared by emulsion polymerization and subsequently hydrogenated is unsuitable for use in the practice of the instant invention. In this regard it is to be noted that an emulsion polybutadiene contains considerably less than 85 percent 1,4-addition.

The polymers of ethylene used in preparing the novel compositions of this invention have a crystallinity of at least 70 percent, preferably at least 80 percent, and more desirably at least 90 percent, at 25° C. The crystallinity of the polymers can be determined by measurements of nuclear magnetic resonance using a sample of polymer which is in a state approaching equilibrium at 25° C. An approach to this equilibrium state can be achieved by heating the polymer sample to a temperature about 50° C. above its crystalline melting point, maintaining the sample at this temperature for about 1 hour, and then cooling to 25° C. at a rate characterized by a fall of about 1.5° C. per minute at 135° C. The ethylene polymers have a density of at least 0.94 at 25° C. The polymers often have an inherent viscosity of at least 0.8, preferably an inherent viscosity between 1.2 and about 10, as determined from a solution of 0.2 gram of polymer in 50 cc. of tetralin at 130° C. The softening point of the polymer will vary with the particular polymer used, increasing as the density and crystallinity of the polymer increases. Generally, the softening point of the ethylene polymer is about 250° F., preferably in the approximate range of 250 to 300° F., and is several degrees higher, e.g., about 10° F., than the melting point of the polymer.

Ethylene polymers having the above described properties and suitable for use in preparing the novel compositions of this invention can be produced by a method disclosed in U.S. Patent 2,825,721, issued to J. P. Hogan et al. on March 4, 1958. As described in detail in this patent, ethylene polymers can be produced by contacting ethylene, or mixtures of ethylene and other unsaturated hydrocarbons, e.g., mixtures of ethylene with minor amounts of monoolefins, such as propylene, 1-butene, and 1-hexene, with a catalyst comprising as its essential ingredient from 0.1 to 10 or more weight percent of chromium in the form of chromium oxide, preferably including a substantial amount of hexavalent chromium. The chromium oxide is ordinarily associated with at least one other oxide, particularly at least one oxide selected from the group consisting of silica, alumina, zirconia and thoria. The term "polymers of ethylene" as used herein is intended to include polymers obtained by polymerizing ethylene and mixtures of ethylene and other unsaturated hydrocarbons. It is preferred that the ethylene polymers which are used in preparing the compositions of this invention be formed from polymers of ethylene produced in accordance with the method described in the Hogan et al. patent.

Ethylene polymers suitable for use in the practice of this invention can be obtained by other methods, e.g., by proceeding according to the processes disclosed by J. A. Reid in copending U.S. patent application Serial No. 494,281, filed March 14, 1955 and now abandoned, and by H. D. Lyons and Gene Nowlin in copending U.S. patent application Serial No. 495,054, filed March 17, 1955. As disclosed in the first of these patent applications, a solid polymer of ethylene can be produced by contacting ethylene with a catalyst comprising a mixture of an organometallic compound, such as an aluminum trialkyl, and a halide of a group IV metal of the periodic table, such as titanium tetrachloride. As disclosed in the latter of the aforementioned patent applications, ethylene can be polymerized in the presence of a catalyst comprising an organometallic halide, such as ethylaluminum dichloride, and a halide of a group IV metal, such as titanium tetrachloride, so as to provide a high molecular weight ethylene polymer.

The polymers of butadiene used in preparing the hydrogenated polybutadiene are polymers containing from 85 to 100 percent of 1,4-addition. It is also within the scope of the invention to employ copolymers of 1,3-butadiene and styrene which contain not more than 30 parts by weight of styrene per 100 parts by weight of the total polymer. Butadiene polymers having the desired configuration can be prepared in what may be broadly termed an organometal catalyzed polymerization process. The catalyst used in the polymerization can be broadly described as comprising a complex metal hydride or an organometallic compound.

One particularly effective catalyst for use in preparing a polybutadiene containing at least 85 percent 1,4-addition comprises an organolithium compound corresponding to the general formula RLi. The R in this formula is an alkyl radical, preferably containing from 1 to 10, inclusive, carbon atoms. Examples of suitable organolithium compounds include methyllithium, isopropyllithium, n-butyllithium, tert-octyllithium, n-decyllithium, and the like.

Another very effective catalyst system suitable for use in preparing the butadiene polymers comprises (a) a compound corresponding to the formula $R'_nM$ wherein $R'$ is an alkyl radical preferably containing up to and including 12 carbon atoms, M is a metal selected from the group consisting of aluminum, gallium, indium, thallium, beryllium, mercury and zinc, and $n$ is an integer equal to the valence of the metal M, and (b) a halide of a metal selected from the group consisting of titanium, zirconium, and vanadium. Of the metal halides, it is preferred to use the chlorides and iodides in the catalyst system. With regard to the compounds corresponding to the formula $R'_nM$, the alkyl groups can be either straight or branched chain alkyls, for example, methyl, ethyl, propyl, isopropyl, n-butyl, isobutyl, pentyl, isohexyl, n-hexyl, n-heptyl, n-octyl, or tert-dodecyl. Furthermore, it is to be understood that the alkyl groups in the aforementioned general formula can be the same or they can be different. For example, it is within the scope of the invention to employ an organometal compound, such as diisobutylmonoethylaluminum or isobutylethylzinc in the catalyst system. Examples of other suitable organometal compounds include trimethylaluminum, triethylaluminum, triisobutylaluminum, tri-n-pentylaluminum, tri-n-hexylaluminum, tri-n-octylaluminum, tri-n-butylaluminum, tri-n-octylgallium, triisobutylindium, tri-n-pentylindium, dimethylmercury, diethylmercury, diisobutylmercury, diethylmercury, di-n-decylmercury, di-n-undecylmercury, diethylzinc, di-n-octylzinc, di-n-undecylzinc, di-n-dodecylzinc, and the like. It is also within the purview of the invention to employ mixtures of the organometal compounds in the catalyst system.

Still another catalyst system which can be effectively used to produce a polymer of butadiene containing at least 85 percent 1,4-addition comprises (a) a complex hydride corresponding to the formula $M'M''H_4$, wherein $M'$ is aluminum or boron and $M''$ is an alkali metal, and (b) titanium tetraiodide. Examples of compounds corresponding to the formula $M'M''H_4$ which can be used include lithium aluminum hydride, lithium borohydride, and the like.

When polymerizing 1,3-butadiene with one of the aforementioned catalyst systems, the process is usually carried out in the presence of a hydrocarbon diluent which is not deleterious to the catalyst system. Examples of suitable diluents include aromatic, paraffinic and cycloparaffinic hydrocarbons, it being understood that mixtures of these materials can also be used. Specific examples of suitable hydrocarbon diluents include propane, isobutane, n-pentane, isodecane, n-dodecane, cyclopentane, cyclohexane, methylcyclohexane, benzene, toluene, xylene, and the like. While temperature at which the polymerization is carried out can vary over a rather wide range, e.g., from $-80$ to $200°$ C., it is usually preferred to operate at a temperature in the range of $-20$ to $150°$ C. The polymerization reaction can be carried out under autogeneous pressures. The polymerization is preferably conducted at pressures sufficient to maintain the monomeric material substantially in the liquid phase. The pressure will thus depend upon the diluent being employed and the temperature at which the polymerization is conducted. However, higher pressures can be utilized if desired, these pressures being obtained by some such suitable method as pressurization of the reactor with a gas which is inert with respect to the polymerization reaction. The polymerization is usually carried out in the liquid phase; however, depending upon the diluent and the polymerization temperature selected, the polymerization can be conducted in the solid phase.

The amount of the catalyst which is used in the preparation of the butadiene polymers can vary over a rather wide range. When utilizing an organolithium compound, at least 0.05 part by weight of this material per 100 parts by weight of butadiene is employed. A preferred catalyst level is from 0.1 to 2 parts by weight of the organolithium compound per 100 parts by weight of butadiene charged to the polymerization zone. When utilizing a catalyst comprising an organometal compound and a metal halide, the amount of the organometal compound used in the catalyst composition is usually in the range of 1.0 to 15 mols per mol of the metal halide. However, a preferred mol ratio is from 1.1:1 to 8:1 of the organometal compound to the metal halide. The concentration of the total catalyst composition, i.e., organometal compound and titanium tetraiodide, is usually in the range of 0.05 to 10 weight percent, preferably in the range of 0.05 to 5 weight percent, based on the total amount of 1,3-butadiene charged to the polymerization zone. When a catalyst comprising a complex metal hydride and titanium tetraiodide is employed to polymerize 1,3-butadiene, the amount of the complex metal hydride used in the catalyst composition is usually in the range of 0.5 to 6 mols per mol of titanium tetraiodide. However, a preferred ratio is from 0.8 to 3.0 mols of the complex metal hydride per mol of titanium tetraiodide. The amount of this latter catalyst used in the polymerization is usually in the range of about 0.10 weight percent to 10 weight percent or higher, preferably in the range of 0.25 weight percent to 7 weight percent, based on the total amount of butadiene charged to the polymerization reactor.

Examples of catalyst systems according to the foregoing disclosure which are preferred for use in preparing the butadiene polymers are as follows: (1) triisobutylaluminum and titanium tetraiodide, (2) triethylaluminum and titanium tetrachloride, (3) lithiumaluminum hydride and titanium tetraiodide, (4) diethylzinc and titanium tetraiodide, and (5) n-butyllithium. It is to be understood that it is not intended to limit the invention to any specific method for preparing the polymers of 1,3-butadiene. Any butadiene polymers in which from 85 to 100 percent of the polymer is formed by 1,4-addition of the monomer unit is suitable for use in preparing the hydrogenated polymers which are used in the novel compositions of this invention.

The hydrogenated polymers of butadiene used in the composition of this invention are prepared by a catalytic hydrogenation procedure. In carrying out the hydrogenation process, the butadiene polymer, substantially free of salts or other materials which might act as hydrogenation catalyst poisons, is fed to a hydrogenation reactor in the form of a solution or dispersion in a suitable solvent. In some instances, the polymers dissolve completely in the solvent while in other cases a dispersion is formed.

The catalyst used in the hydrogenation of the butadiene polymer is preferably a nickel-kieselguhr catalyst, having a particle size between 1 and 8 microns, which has been activated at a temperature preferably between 500 and 800° F. for a period of several hours by passing hydrogen thereover. While catalysts of larger particle size can be used, they are not as satisfactory. One catalyst which has been found to be quite suitable is a nickel-kieselguhr catalyst treated at 675° F. for 2 hours, using approximately 100 volumes of hydrogen per volume of catalyst. Such treatment provides a reduced nickel content of about 40 percent. From 2 to 30 weight percent of the catalyst on the unreduced basis, based upon the weight of the polymer, gives a preferred rate of hydrogenation.

Many solvents can be used to dissolve the butadiene polymer, but the ones which are preferred are the cycloparaffins containing 5 or 6 carbon atoms in the ring and their alkyl derivatives. Solvents, such as cyclopentane, methylcyclopentane, dimethylcyclopentane, ethylcyclopentane, cyclohexane, methylcyclohexane, and dimethylcyclohexane are examples of these solvents, the preferred solvent being methylcyclohexane. Other solvents which can be employed include decalin, benzene, toluene, dioxane, isooctane, isoheptane, n-heptane, tetralin, and the like. Mixtures of these solvents can also be used.

After the polymer is dissolved in the solvent, the hydrogenation catalyst is added. The mixture is then introduced into a reactor, hydrogen is added, and the temperature is raised to a suitable level to initiate the reaction. Reaction pressures are preferably in the range of atmospheric to 3000 p.s.i.g., the usual range being from 100 to 1000 p.s.i.g. The temperature can vary from 75° F. up to the degradation temperature of the polymer or the critical temperature of the solvent, the maximum temperature reaching as high as 575° F. The preferred temperature range is between 300 and 525° F. Reaction times in the range 0.25 to 24 hours, preferably from 0.5 to 12 hours, are utilized.

In order to obtain hydrogenated polymers having the desired characteristics for blending with the ethylene polymers, the unsaturation should be reduced to a value of about zero to 50 percent, based upon the theoretical value of 100 percent for the unhydrogenated polymer. Preferably, the hydrogenation is continued until the residual unsaturation is less than 30 percent.

It has been found that the butadiene polymers prepared as described herein hydrogenate much more rapidly than polymers of butadiene prepared by an emulsion polymerization process. The hydrogenated polymers are plastic rather than rubbery, and they are crystalline and have a high crystalline freezing point. The hydrogenated polymers also have a low melt viscosity, and they are transparent and colorless or, at the most, only slightly colored.

The hydrogenated polymers of butadiene used in the composition of this invention are compatible in all proportions with the high density, highly crystalline ethylene polymers. The compositions preferably contain from 1 to 99 parts by weight of the ethylene polymer and from 99 to 1 parts by weight of the hydrogenated butadiene polymer. A very desirable composition according to this invention contains from 20 to 80 parts by weight of the polyethylene and from 80 to 20 parts by weight of the hydrogenated polybutadiene. A preferred composition contains a major amount of the ethylene polymer and a minor amount of the hydrogenated polybutadiene. Blending of the hydrogenated butadiene polymers with the solid ethylene polymers can be accomplished by any suitable method. In one method, the composition is prepared by blending the solid polymers on a roll mill or in a Banbury mixer. This blending operation is carried out at a temperature above the softening point of the ethylene polymer, e.g., at a temperature of about 300° F. Any temperature above the softening point of the ethylene polymer can be employed as long as the temperature is below that at which degradation of the polymer occurs. Another method for preparing the compositions of this invention involves dissolving the hydrogenated butadiene polymer and the solid ethylene polymer in a suitable hydrocarbon solvent and thereafter removing the solvent, e.g., by stripping. The compositions can also be prepared by the use of an extrusion device so as to provide a product which is in the form of pellets.

A more comprehensive understanding of the invention can be obtained from a consideration of the following example which is not intended, however, to be unduly limitative of the invention.

EXAMPLE

Compositions according to this invention were prepared in the manner described hereinafter. For comparison purposes, a composition was also formulated which comprised a high density, highly crystalline polymer of ethylene and a hydrogenated polymer of butadiene which had been prepared by an emulsion polymerization process.

Two runs were carried out in which 1,3-butadiene was polymerized to polymers containing in excess of 85 percent 1,4-addition. The recipes used in these runs, designated as runs 1 and 2, were as follows:

|  | Parts by Weight | |
| --- | --- | --- |
|  | Run 1 | Run 2 |
| Butadiene | 100 | 100 |
| Cyclohexane | 390 |  |
| Toluene |  | 577 |
| n-Butyllithium | 0.160 (2.5 moles) |  |
| Triisobutylaluminum |  | 0.764 |
| Titanium tetraiodide |  | 0.285 |
| Temperature, °C | 50 | 30 |
| Time, hours | 4 | 18 |
| Conversion, percent [1] | 100 | 90 |
| Inherent viscosity [2] | 1.52 | 1.77 |
| Gel, percent | 0 | 0 |

[1] This value represents the yield of polymer obtained after coagulation, washing, and drying.

[2] One-tenth gram of polymer was placed in a wire cage made from 80-mesh screen and the cage was placed in 100 ml. of toluene contained in a wide-mouth 4-ounce bottle. After standing at room temperature (approximately 25° C.) for 24 hours, the cage was removed and the solution was filtered through a C porosity sulfur absorption tube to remove any solid particles present. The resulting solution was run through a Medalia viscometer in a 25° C. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the original sample. The wire cage removed from the toluene solution was examined for gel. None was present.

In run 1, the polymerization was effected in 12-ounce bottles. Upon completion of the polymerization, wet cyclohexane (prepared by adding a small amount of water to cyclohexane but not enough to exceed its solubility) was injected to inactivate the catalyst, and 0.1 weight percent, based on the monomers charged, of Polygard (tris-nonylphenyl phosphite) was added. The polymer solution was hydrogenated without further treatment.

In run 2, the polymerization was also effected in 12-ounce bottles. The bottles were opened and the contents were combined and washed with one percent sulfuric acid at 30° C. and then with water in order to inactivate the catalyst and remove catalyst residue. The polymer was coagulated by pouring the solution into isopropanol. Polygard (1.5 grams) was incorporated into the rubber before it was dried. The rubber was dried overnight (about 15 hours) in a vacuum oven at 60° C., and the resulting product weighed 130 grams.

A rocking autoclave provided with a glass liner and having a capacity of 1700 cc. was used in the hydrogenation of each of the above-described polymers. In hydrogenating the polymer from run 1, the autoclave was swept twice with nitrogen after which 500 cc. of the polymer solution (75 grams polymer) and 88 cc. (20 grams) of nickel-on-kieselguhr catalyst slurry in methylcyclohexane were charged. The catalyst was prepared by reducing nickel hydroxide on kieselguhr with hydrogen and quenching it with methylcyclohexane in a manner similar to that hereinafter described. It was diluted with methylcyclohexane to give a composition containing 227 grams of the reduced compound per liter of slurry. After charging the ingredients, the reactor was pressured twice to 60 p.s.i.g. with nitrogen, bled down each time, and then purged twice with hydrogen (pressured to 150 p.s.i.g. and bled down each time). The autoclave was thereafter pressured to 150 p.s.i.g. with hydrogen and heating was commenced. The mixture was heated while hydrogen was passed into the system to maintain the pressure as indicated in the following table:

| Time, Minutes | Temperature, ° F. | Total Pressure p.s.i.g. |
|---|---|---|
| 0 | 80 | 150 |
| 40 | 160 | 200 |
| 70 | 300 | 1 200 |
| 95 | 410 | 2 500 |
| 247 | 395 | 500 |
| 420 | 380 | 500 |

[1] Pressure increased to 500 p.s.i.g.
[2] Heat off; temperature increasing rapidly.

The autoclave was allowed to rock overnight with the heat off after which the liner was taken out and the product, which had solidified upon cooling, was removed by dissolving it in one liter of hot methylcyclohexane. The solution was diluted further with two liters of methylcyclohexane, heated to 160° F., and then passed through a magnetic separator to remove the catalyst. It was then treated with 10 cc. of glacial acetic acid plus 10 cc. of water to remove any color that remained after passing the mixture through the magnetic separator. The polymer was precipitated by pouring the solution into isopropyl alcohol and then separated by filtration. The polymer was vacuum dried for 12 hours at 210° F. and a white solid product weighing 51.6 grams was recovered.

Hydrogenation of the polymer from run 2 was accomplished in a manner similar to that used in hydrogenating the polymer from run 1. The autoclave was swept twice with nitrogen after which 70 grams of polymer, 500 cc. of methylcyclohexane, and 88 cc. (20 grams) of nickel-on-kieselguhr catalyst slurry (prepared as hereinafter described) were charged. The reactor was pressured twice to 60 p.s.i.g. with nitrogen, bled down each time, and then pressured twice to 200 p.s.i.g. with hydrogen and bled down each time. It was then pressured to 205 p.s.i.g. with hydrogen and heating was started. Hydrogen was passed into the system during heating to maintain the pressure as indicated in the following table:

| Time, Minutes | Temperature, ° F. | Total Pressure, p.s.i.g. |
|---|---|---|
| 0 | 90 | 205 |
| 30 | 125 | 205 |
| 70 | 300 | 1 205 |
| 100 | 400 | 500 |
| 150 | 395 | 500 |
| 265 | 400 | 2 490 |
| 375 | 400 | 500 |
| 435 | 405 | 3 500 |

[1] Pressured to 400 p.s.i.g.
[2] Pressured to 500 p.s.i.g.
[3] Heat off; allowed to cool overnight.

The reaction mixture solidified upon cooling. Three liters of methylcyclohexane was added and the mixture heated to effect solution of the hydrogenated polymer. The solution, heated to 160° F., was passed through a magnetic separator and then treated with 10 cc. of glacial acetic acid and 50 cc. of water. The polymer was precipitated by pouring the solution into methanol. It was filtered and vacuum dried for 14 hours at 210° F. The product, which was insoluble in cold methylcyclohexane, had a slightly gray color and weighed 33.1 grams.

Ethylene was polymerized in the presence of a chromium oxide-silica-alumina catalyst containing 2.5 weight percent chromium as chromium oxide. Cyclohexane was employed as the solvent for the reaction. Prior to its use in the polymerization, the catalyst was activated in air by being subjected to gradually increasing temperatures up to 950° F. The operating conditions under which the ethylene was polymerized are set forth hereinbelow in Table I.

*Table I*

| | |
|---|---|
| Temperature variation, ° F | 280–300 |
| Pressure, p.s.i.g | 420 |
| Ethylene feed rate, s.c.f.h | 14,300 |
| Solvent feed rate, g.p.m | 18 |
| Catalyst concentration, wt. percent | 1.0–1.4 |
| Polymer concentration, wt. percent | 3.8–7.1 |

The high density, highly crystalline polymer of ethylene, prepared as described above, was blended on a roll mill with each of the previously described hydrogenated polymers, using a 70/30 ratio of the polyethylene to the hydrogenated polymer. The ethylene polymer was also blended in a Banbury mixer with a hydrogenated rubbery polybutadiene which was prepared by emulsion polymerization at 41° F. The blending operations were carried out at a temperature between 300 and 310° F. The recipe used in preparing the polybutadiene by emulsion polymerization is as follows:

| | Parts by weight |
|---|---|
| Butadiene | 100 |
| Water | 220 |
| Rosin soap, K salt [1] | 5.0 |
| KOH | 0.1 |
| KCl | 0.5 |
| Daxad 11 [2] | 0.1 |
| Sequestrene AA [3] | 0.023 |
| Sodium formaldehyde sulfoxylate | 0.05 |
| p-Methane hydroperoxide | 0.06 |
| Tert-dodecyl mercaptan | 0.43 |
| Methanol rinse | 0.25 |

[1] Dresinate 214: K salt of disproportionated rosin acid.
[2] Sodium salt of condensed alkyl aryl sulfonic acid.
[3] Ethylene diamine tetraacetic acid.

Nine batches of polymer were prepared using the above recipe. Coagulation was effected by pouring the latex into isopropanol. The rubber crumb from each batch was washed three times with water at 140° F. The rubber crumb from seven of the batches was vacuum dried at 160° F. for 7 hours while that from two of the batches was extrusion dried. In the extrusion drying, a vacuum of 22 inches of Hg was used to withdraw water vapor. The jacket oil temperature was 350° F., and the extrusion rate was 17.8 pounds in 13 minutes. Each of the nine batches of polybutadiene was hydrogenated. The procedure described hereinbelow was used in hydrogenating the emulsion polymers.

Hydrogenation was effected in a 10-gallon stainless steel autoclave which was purged with nitrogen prior to charging the ingredients. A solution of 1600 grams of polybutadiene in 24 pounds of methylcyclohexane was prepared and pumped through a heat exchanger, where the temperature was raised to about 275° F., and then into the reactor. Along with the polybutadiene solution, there was charged 960 cc. of a reduced nickel-on-kieselguhr catalyst slurry (120 grams of catalyst). The catalyst slurry was prepared by reducing 250 grams of nickel hydroxide on kieselguhr with hydrogen at 775° F. for 4 hours and quenching with 1000 cc. of methylcyclohexane. It was then diluted with methylcyclohexane to give a slurry containing 125 grams of the reduced material per liter of hydrocarbon. The catalyst slurry was rinsed into the reactor with 1040 cc. of methylcyclohexane. After the rubber solution was pumped into the reactor, the lines were rinsed with 7 pounds of methylcyclohexane.

The nitrogen was flushed out with hydrogen after charging the polymer solution and catalyst slurry, and the reactor was pressured with hydrogen before heating was started. The mixture was then heated while hydrogen was passed into the system to maintain the pressure as indicated in the following table:

| Time, Minutes | Temperature, °F. | Total Pressure, p.s.i.g. |
|---|---|---|
| 0 | 440 | [1] 275 |
| 8 | 390 | 410 |
| 20 | 445 | [2] 350 |
| 50 | 450 | 500 |
| 80 | 450 | 500 |
| 115 | 450 | 505 |
| 160 | 450 | 510 |
| 200 | 450 | [3] 505 |

[1] Repressured to 335 p.s.i.g.
[2] Repressured to 500 p.s.i.g.
[3] Heat off; blowdown.

The reaction mixture was blown down into a tank containing 33 pounds of methylcyclohexane. Seventeen pounds of methylcyclohexane was pumped into the reactor to rinse it and then added to the blowdown tank. The mixture was centrifuged to remove a portion of the catalyst and then pressure filtered to remove the remainder of the catalyst. The nine batches were blended, and the hydrogenated polybutadiene was precipitated with water and was vacuum dried 8 hours at 210° F.

The hydrogenated polybutadiene was employed in preparing the 70/30 blend of the high density, highly crystalline polyethylene and the hydrogenated polybutadiene.

Properties of the high density, highly crystalline polyethylene, each of the hydrogenated polymers hereinbefore described, and each of the 70/30 blends of polyethylene with hydrogenated polybutadiene are shown below in Table II. Dashes in the table indicate that that particular property was not determined.

*Table II*

|  | Polyethylene A | B [1] | C [2] | D [3] | 70/30 Blends | | |
|---|---|---|---|---|---|---|---|
|  |  |  |  |  | A/B | A/C | A/D |
| Unsaturation [4] (Unhydrogenated Polymer): |  |  |  |  |  |  |  |
|   Vinyl | ------ | 11.2 | 4.2 | 17–18 | ------ | ------ | ------ |
|   1,4-Addition | ------ | 88.8 | 95.8 | 82–83 | ------ | ------ | ------ |
| Unsaturation, percent [5] | ------ | <1 | 1.4 | 8.4 | ------ | ------ | ------ |
| Melt Index [6] | 1.5 | 0.60 | 0.37 | 0.13 | 1.04 | 0.24 | 1.5 |
| Density at 23° C., g./cc. [7] | 0.961 | 0.908 | 0.922 | 0.899 | 0.939 | 0.947 | 0.952 |
| Stiffness, p.s.i. [8] | 155,000 | <10,000 | <10,000 | <10,000 | 80,000 | 97,000 | 76,000 |
| Tensile yield, p.s.i. [9] | 4,398 | 4,423 | 4,090 | 2,096 | 2,678 | 3,276 | 2,254 |
| Elongation, percent [9] | 20 | 1,033 | 973 | 1,308 | 358 | 189 | 22 |
| ESC (F$_{50}$), hours [10] | 10 | ([11]) | ([11]) | ([11]) | [12] >1,000 | [12] >1,000 | 70 |
| Crystallinity, percent | [13] 92 | [14] 62 | [14] 63 | [14] 46 | ------ | ------ | ------ |
| Crystalline freeze point, °F. [15] | 251 | 205 | ------ | ------ | 251 | 251 | 251 |

[1] Hydrogenated polybutadiene from n-butyllithium catalyzed polymerization (except as noted).
[2] Hydrogenated polybutadiene from triisobutylaluminum-titanium tetraiodide catalyzed polymerization (except as noted).
[3] Hydrogenated polybutadiene from emulsion polymer (except as noted).
[4] In determining the unsaturation of the unhydrogenated polymers prepared with organometal catalysts, the procedure described hereinafter was followed. The percent 1,2-addition and vinyl unsaturation is the same for the unhydrogenated polymer. When the polybutadiene is hydrogenated, the vinyl groups are converted to ethyl groups. Samples of the polymers were dissolved in carbon disulfide to form a solution having approximately 25 grams of polymer per liter of solution. The infrared spectrum of each of the solutions (percent transmission) was then determined in a commercial infrared spectrometer. The percent of total unsaturation present as 1,2- or vinyl, was calculated according to the following equation and consistent units: $=E/tc$ where $\epsilon =$ extinction coefficient (liters-mols$^{-1}$-centimeters$^{-1}$); $E=$ extinction (log $I_0/I$); $t=$ path length (centimeters) and $c=$ concentration (mols/liter). The extinction was determined at the 11.0 micron band, and the extinction coefficient was 184 (liters-mols$^{-1}$-centimeters$^{-1}$). The percent of total unsaturation present as 1,4-addition was obtained by subtracting the 1,2- (vinyl), from the theoretical unsaturation, assuming one double bond per each $C_4$ unit in the polymer. The percent unsaturation shown for the emulsion polybutadiene is a literature value obtained from an article by J. L. Binder appearing in Industrial and Engineering Chemistry, 46, 1727–1730 (1954).
[5] Determined by dissolving sample of hydrogenated polymer in cyclohexane and treating with an excess of iodine monochloride after which potassium iodate was added and the liberated iodine was titrated with sodium thiosulfate.
[6] Determined by method of ASTM D-1238-52T. The melt index is defined as the grams of polymer extruded in 10 minutes through an 0.0825 inch orifice at 190° C. In determining the melt index of products A, B, and D, a load of 2,160 grams was used whereas with product C, the load was 46.5 grams.
[7] Run on ethanol-water density gradient column at 23° C.
[8] Determined by method of ASTM D-747-58. A Tinius-Olsen Stiffness Tester having ranges of 0.10 to 6.0 inch pounds was used. Test specimens, died out of compression molded slabs, measured 0.500 inch wide, 4.50 inches long and 0.07 inch thick. The tests were performed at 73±2° F. An 0.15 pound weight was used for samples B, C and D and an 0.25 pound weight was used for A, A/B, A/C and A/D. The bending span in all cases was 2.0 inches.
[9] Determined by method of ASTM D-412-51T. (Die C and crosshead speed of 20 inches per minute.)
[10] Test specimens for the environmental stress cracking tests were die cut from compression molded slabs 0.125±0.005 inch thick. The dimensions of these specimens were 1.5±0.1 inches by 0.50±0.02 inch. Each sample was given a controlled imperfection 0.750±0.005 inch long and 0.020–0.025 inch deep parallel to the long edges of the sample and centered on one of the broad faces. Each of the 10 test specimens was bent into a loop with the controlled imperfection on the outside and inserted in a holder one above the other in a manner such that the samples did not touch one another. The holder was then inserted in a tube which was filled to approximately 0.5 inch above the top specimen with an alkyl aryl polyethylene glycol (Igepal CO-630, General Dyestuff Corp., New York, N.Y.), a surface active agent, which had been adjusted to a temperature of 23±1.1° C. The tube was then stoppered and placed in a constant temperature bath at 50±0.5° C. The controlled imperfections were not allowed to touch the tube during the test. The test specimens were examined at intervals, and any crack visible to the unaided eye was interpreted as a failure, exclusive of extension of the controlled imperfection. The number of failures was plotted versus the logarithm of time and the best line was drawn through these points. The stress-crack time, $F_{50}$, is the time in hours taken from the curve at five failures. This test is similar to that described in Industrial & Engineering Chemistry, 43, 117–121 (1951).
[11] Does not undergo environmental stress cracking.
[12] Test discontinued after 1,000 hours.
[13] Determined by measurement of nuclear magnetic resonance.
[14] Determined by infrared technique.
[15] A sample of the polymer was melted and a thermocouple was inserted. The temperature was recorded as the sample cooled, and the crystalline freezing point was taken as the midpoint of the plateau in the cooling curve. Polymer D shown in the table was amorphous.

The compositions of this invention possess advantages over compositions prepared by blending high density, highly crystalline ethylene polymers with hydrogenated polybutadiene prepared by methods other than those specified herein. Thus, it is seen from an examination of Table II that the compositions of this invention possess high stiffness and are highly resistant to environmental stress cracking. On the other hand, a composition prepared with a hydrogenated emulsion polybutadiene was subject to stress cracking and had a lower stiffness value. The compositions of this invention are particularly suitable for wire insulation, for the fabrication of pipe, and for other applications where stress cracking presents a problem.

It will be apparent to those skilled in the art that many modifications and variations of the instant invention can be made in view of the foregoing disclosure. Such modifications and variations are believed to clearly come within the spirit and scope of the invention.

We claim:

1. A composition of matter comprising a polymer of ethylene having a density of at least 0.94 at 25° C. and a crystallinity of at least 70 percent at 25° C. and a hydrogenated polymer of butadiene, the unsaturation of said polymer of butadiene having been reduced to a value of about zero to 50 percent of theoretical and said polymer of butadiene containing at least 85 percent 1,4-addition, the remainder of the polymer being formed by 1,2-addition of the butadiene, and having been prepared by polymerizing 1,3-butadiene with a catalyst selected from the group consisting of (1) a catalyst comprising a compound having the formula RLi, wherein R is an alkyl radical containing from 1 to 10, inclusive, carbon atoms, (2) a catalyst comprising (a) a compound having the formula $R'_nM$, wherein R' is an alkyl radical containing from 1 to 12, inclusive, carbon atoms, M is a metal selected from the group consisting of aluminum, gallium, indium, thallium, beryllium, mercury, and zinc, and $n$ is an integer equal to the valence of the metal M, and (b) a hallide of a metal selected from the group consisting of titanium, zirconium, and vanadium, and (3) a catalyst comprising (a) a complex hydride having the formula $M'M''H_4$, wherein M' is a member selected from the group consisting of aluminum and boron, and M'' is an alkali metal, and (b) titanium tetraiodide.

2. A composition of matter comprising a polymer of ethylene having a density of at least 0.94 at 25° C. and a crystallinity of at least 90 percent at 25° C. and a hydrogenated polymer of butadiene, the unsaturation of said polymer of butadiene having been reduced to a value of about zero to 50 percent of theoretical and from 85 and up to 100 percent of said polymer of butadiene being formed by 1,4-addition of the butadiene, the remainder of said polymer being formed by 1,2-addition of the butadiene, and said polymer of butadiene having been prepared by polymerizing 1,3-butadiene with a catalyst selected from the group consisting of (1) a catalyst comprising a compound having the formula RLi, wherein R is an alkyl radical containing from 1 to 10, inclusive, carbon atoms, (2) a catalyst comprising (a) a compound having the formula $R'_nM$, wherein R' is an alkyl radical containing from 1 to 12, inclusive, carbon atoms, M is a metal selected from the group consisting of aluminum, gallium, indium, thallium, beryllium, mercury, and zinc, and $n$ is an integer equal to the valence of the metal M, and (b) a halide of a metal selected from the group consisting of titanium, zirconium, and vanadium, and (3) a catalyst comprising (a) a complex hydride having the formula $M'M''H_4$, wherein M' is a member selected from the group consisting of aluminum and boron, and M'' is an alkali metal, and (b) titanium tetraiodide.

3. A composition of matter comprising from 1 to 99 parts by weight of a polymer of ethylene having a density of at least 0.94 at 25° C. and a crystallinity of at least 90 percent at 25° C. and from 99 to 1 parts by weight of a hydrogenated polymer of butadiene, the unsaturation of said polymer of butadiene having been reduced to a value of about zero to 50 percent of theoretical and from 85 and up to 100 percent of said polymer of butadiene being formed by 1,4-addition of the butadiene, the remainder of said polymer being formed by 1,2-addition of the butadiene, and said polymer of butadiene having been prepared by polymerizing 1,3-butadiene with a catalyst selected from the group consisting of (1) a catalyst comprising a compound having the formula RLi, wherein R is an alkyl radical containing from 1 to 10, inclusive, carbon atoms, (2) a catalyst comprising (a) a compound having the formula $R'_nM$, wherein R' is an alkyl radical containing from 1 to 12, inclusive, carbon atoms, M is a metal selected from the group consisting of aluminum, gallium, indium, thallium, beryllium, mercury, and zinc, and $n$ is an integer equal to the valence of the metal M, and (b) a halide of a metal selected from the group consisting of titanium, zirconium, and vanadium, and (3) a catalyst comprising (a) a complex hydride having the formula $M'M''H_4$, wherein M' is a member selected from the group consisting of aluminum and boron, and M'' is an alkali metal, and (b) titanium tetraiodide.

4. A composition of matter according to claim 3 which comprises from 20 to 80 parts by weight of said polymer of ethylene and from 80 to 20 parts by weight of said hydrogenated polymer of butadiene.

References Cited in the file of this patent

UNITED STATES PATENTS

| | | |
|---|---|---|
| 2,369,471 | Latham | Feb. 13, 1945 |
| 2,834,751 | Jones | May 13, 1958 |
| 2,877,206 | Scott | Mar. 10, 1959 |